March 24, 1970 J. KUTZ 3,502,021
ROLLS FOR EQUIPMENT FOR THE PRESSURE TREATMENT OF WEBS
TO REMOVE MOISTURE FROM THE SAME
Filed Feb. 7, 1967
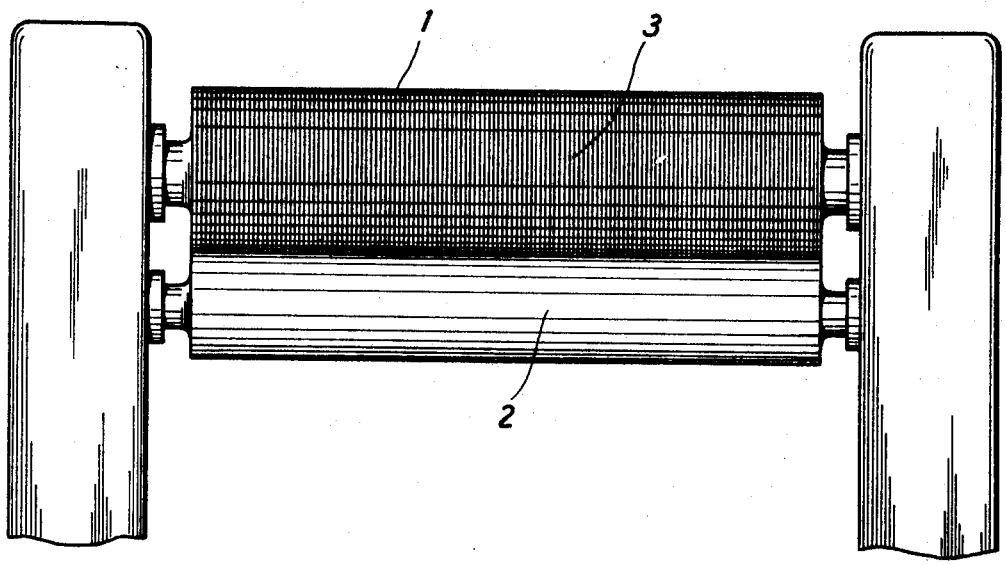
Inventor
JOHANNES KUTZ
BY
ATTORNEYS March 24, 1970     AKIRO TOYODA     3,502,026

ELECTROMAGNETIC PUMP

Filed Jan. 15, 1968     2 Sheets-Sheet 1

$R_1, R_2, R_4$. Proper Resistance
T. Transformer

INVENTOR.
Akira Toyoda
BY
Annett Montague
attorney

United States Patent Office 3,502,026
Patented Mar. 24, 1970

3,502,026
ELECTROMAGNETIC PUMP
Akira Toyoda, 13–16, 4-chome, Minamimagone,
Ohta-ku, Tokyo, Japan
Filed Jan. 15, 1968, Ser. No. 697,865
Int. Cl. F04b 49/00, 17/00; H01h 47/24
U.S. Cl. 103—37                          9 Claims

ABSTRACT OF THE DISCLOSURE

An electromagnetic pump comprising electromagnetic coil circuit connected in series to a transistor, an electromagnetic plunger operated by the circuit and forming a variable iron core of an electromagnetic pump having characteristics of discharge pressure and discharge quantity changeable according to the change of an input current. A signal circuit of the transistor is provided with a detection section substituting the first changed quantity such as temperature, pressure, concentration, illumination, etc. with the electric changed quantity such as voltage, current, etc., and a bridge circuit by a resistor adjusting the detected electric change, and a variable resistor making the predetermined desired value changeable or a circuit capable of performing the same function, whereby the condition of the limited region such as temperature, pressure, concentration, illumination, etc. is constantly maintained at a predetermined and desired value by controlling the condition at any stage which is in direct proportion to the change that affects the illuminated region of the first changed quantity.

The present invention relates to an electromagnetic pump to be used for various purposes.

Heretofore, causing a pump to operate according to the change of temperature or pressure per se is known as well as a control method of so called ON–OFF types wherein a pump is operated to cool the temperature upon closing an electric contact when the temperature reaches above a specific value. Together with the operation of the pump the temperature is thus lowered and then the operation of the pump is supended upon opening of the electric contact when the temperature reaches below the specific temperature, thereby maintaining the temperature at a constant value. Alternately the operation of the pump is suspended upon opening of the electric contact when the pressure reaches the desired specific pressure by operating the pump upon closing the electric contact due to the lowered pressure.

The inventor has been engaged in the manufacture of electromagnetic pumps for many years, and as a result of numerous experiments and research conducted in the operation of electromagnetic pumps with respect to object change factors, such as temperature, pressure, or concentration, etc., the inventor has found that there is a linear relationship between the discharge pressure or the discharge quantity of the electromagnetic pump and the current change, causing the electromagnetic pump to operate in an identical electromagnetic pump.

The present invention, which was conceived by the inventor as the result of the inventor's many years of research and experiment, is based on the fact that the change of the discharge pressure or the discharge quantity of the electromagnetic pump is in linear relationship with the change of the current flowing in the electromagnetic pump, and the invention relates to a method for automatic control of the operation of the electromagnetic pump by controlling automatically the current which operates the electromagnetic pump by substituting the changed value of the object change element such as temperature, pressure or concentration for an electric variation.

It is one object of the present invention to provide an electromagnetic pump with means for the automatic control of discharge quantity or discharge pressure corresponding to a change of nature such as temperature, quantity of flow, or concentration, for example.

It is another object of the present invention to provide an electromagnetic pump of the above-mentioned type wherein no prime mover including a rotary electric motor is required and a power output section and a pump are combined as a compact unit; and which is produced at minimum cost through miniaturization; and is light weight to the utmost extent; and further is capable of producing a strong and high pressure discharge; and is thoroughly durable in operation.

It is yet another object of the present invention to produce an electromagnetic pump circuit for controlling an operating parameter affected by the operation of an electromagnetic pump, comprising an electromagnetic pump having a solenoid and an electromagnetic plunger forming a variable iron core and having an output pressure and an output flow rate variable in direct proportion to the variation of an input current passing through the solenoid, and a control transistor directly connected in series to the solenoid of the electromagnetic pump and having a current output providing an input current signal to the solenoid. Means are provided for detecting a change in an operating parameter affected by the electromagnetic pump and for converting it into a current variation, and operatively connected to the control transistor for controlling the current output thereof. A resistor bridge circuit means connects and transforms the current variation into a suitable value, and a variable circuit means is provided by varying a setting of the operating parameter to a predetermined value, whereby both the output pressure and the output flow rate of the electromagnetic pump are automatically steplessly and proportionately controlled relative to the input current which varies corresponding to the operating parameter so that the latter is maintained at the predetermined value.

With these and other objects in view, which will become apparent in the following detailed description, the present invention will be clearly understood in connection with the accompanying drawings, in which.

Figure 1:
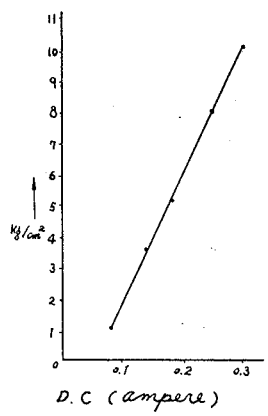
FIGURE 1 is a graph disclosing the relationship between the discharge pressure and electric current of the electromagnetic pump.

Referring now to the drawings, and more particularly to FIG. 1, there is graphically illustrated a relationship between the current flowing in a coil of an electromagnetic pump and the delivery pressure of the pump. The abscissa, X, represents the D.C. current flowing in the electromagnetic pump in amperes, and the ordinate, Y, shows the delivery pressure of the pump in kg./cm.$^2$. It is obvious from this graph that the value of the current flowing in the coil is linearly proportional to the delivery pressure of the pump. This shows that when the cross sectional area of the delivery port is constant, the value of the current flowing in the coil is proportional to the delivery flow rate of the pump. This principle can be experimentally verified.

Figure 2:
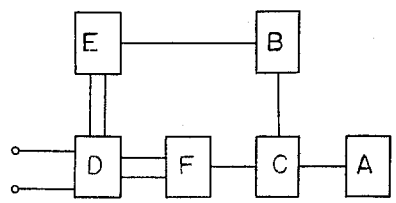
FIG. 2 is a block diagram of the invention.

Referring now again to the drawings, and more particularly to FIG. 2, there is illustrated an electromagnetic pump A with a device B for converting changes of changing object factors, such as temperature, pressure or concentration into an electric change. A control device C is connected to an input constant voltage device D. A full-wave rectifier circuit E is connected to the voltage device D as well as to a half-wave rectifier F. In operating the electromagnetic pump A, if, for instance temperature, pressure or concentration is an object which is controlled by the pump of the present invention, the variation of temperature, pressure or concentration is converted into an electric variation and the electric variation is maintained at a specific desired value. That is, the present invention relates to a method for the automatic control of the operation of the electromagnetic pump to maintain the temperature, pressure or concentration at a specific value.

A half-wave rectifier circuit operatively connected to the pump A from the input constant voltage power supply voltage stabilizing device D in parallel through the half-wave rectifier means F is connected to the device B, which is to detect, for example, one of the variations in temperature, pressure, flow or density, which are the objective variable factors, by means of the full-wave rectifier circuit E consisting of a bridge circuit. The device B converts the variation into an electrical variation and compensates this electrical variation; the device B is further connected to the coil or solenoid $A_1$ of the pump A in which coil plunger $A_2$ of the pump A operates via the control device C comprising transistors and including control semiconductor elements such as control rectifiers. Current is supplied to the coil $A_1$ so as to allow the pump A to deliver a flow or a pressure necessary for maintaining the temperature, pressure, flow or density of the limited area at a certain value.

The references shown in FIG. 2 indicate elements common to FIGS. 3, 5, 6, and 7.

Figure 3:
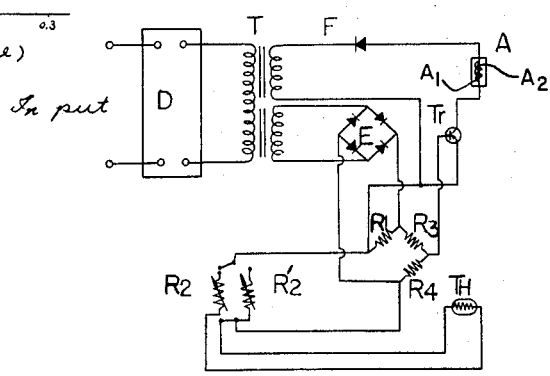
FIGS. 3 and 4 show a thermistor circuit and temperature-resistance characteristics of the thermistor, respectively.

Referring now to the drawings, and in particular to FIG. 3, for a method for automatic control of the electromagnetic pump with respect to the temperature, the device B (FIG. 2) for substituting a temperature variation for an electric variation comprises, for instance, a thermistor $T_H$, and the control device C comprises a transistor $Tr$. The constant voltage current which is half-wave rectified, or a pulse having the same effect, is fed by an electromagnetic pump operating circuit to transistor $Tr$. The thermistor $T_H$ operatively controls the base of the transistor $Tr$, whereby the pump A is controlled such that the discharge pressure or the discharge quantity of the pump is regulated and controlled by regulating the half-wave rectifier current or pulse entering transistor $Tr$ which causes the electromagnetic pump to operate by the variation of the constant voltage D.C. current change according to the electric variation that has substituted the temperature variation, that is, the temperature change, by utilizing the constant voltage current flowing in an electric bridge changing with the temperature change.

The device B which converts a temperature variation into an electrical variation is formed by the bridge circuit in combination with the coil $A_1$ of the electromagnetic pump A by means of the control device C comprising transistor $Tr$; the bridge circuit consists of fixed resistors $R_1$, $R_3$ and $R_4$, a variable resistor $R_2$, and the thermistor $T_H$. The device B utilizes the characteristics of the thermistor $T_H$ of which the resistance changes with changes in temperature. This allows the device B to perform the given function. The purpose of the variable resistor $R_2$ is to change the combined resistance of the bridge circuit including the thermistor $T_H$ and thus to control the pulse which is given to the coil of the electromagnetic pump from the transistor $Tr$. A variable resistor $R'_2$ is used when the automatic control is switched to the manual control. Other circuit arrangements in FIG. 3 are similar to those which have been previously explained. A transformer T is connected between the input constant voltage device D and the rectifiers E and F.

Figure 4:
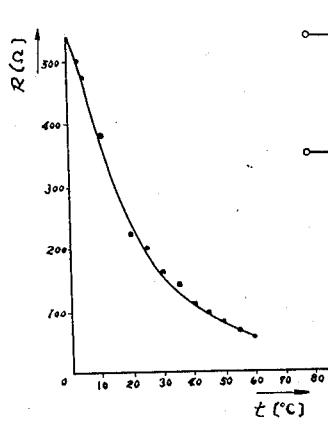

FIG. 4 shows the characteristics of temperature vs. resistance of the thermistor $T_H$. The abscissa, X, represents temperature $t$ (° C.), and the ordinate, Y, represents resistance, R, ohms, of the thermistor $T_H$. This graph shows that the resistance R decreases with an increase in the temperature $t$, and the resistance R increases with a decrease in the temperature $t$. That is, the resistance R decreases with increasing temperature $t$ and, at a certain constant voltage, the current increases with a decrease in the resistance. This property of the thermisor can be directly utilized when it is desired to increase the cooling capacity by increasing the output of the pump, to cope with a temperature rise exceeding a certain definite value in a cooling system, refrigerator, freezer or similar equipment. This makes it possible to eliminate use of the bridge circuit operated in conjunction with resistors. Thus it becomes sufficient that the resistance produced in the thermistor be amplified and compensated and be connected in series to the coil of the electromagnetic pump; whereas, in the case of a heating system or boiler system, it is necessary to increase the output of the pump so as to intensify combustion by supplying more fuel to the furnace if the temperature of the system is lowered below a certain definite value. Under this condition, the resistance R of the thermistor increases with a lowering of the temperature $t$, and at a certain constant voltage, the current flowing in the coil of the pump A decreases with a decrease in the temperature $t$. If so, the purpose of the heating system will not be attained. It is therefore necessary to make an arrangement to increase the current to flow in the coil. For example the bridge circuit as shown in FIG. 3 is formed by the use of the resistor, thereby increasing the temperature vs. resistance characteristics of the thermistor $T_H$.

When a semiconductor element of which the resistance increases with an increase in temperature is utilized instead of the thermistor, the use of the resistance bridge circuit is not required. The same effect can be realized by an arrangement wherein instead of the thermistor, a semiconductor element of positive characteristic is connected in series to the coil $T_1$ of the electromagnetic pump A.

As illustrated in FIG. 1, the electric current flowing in the electromagnetic pump is experientally in direct proportion to the discharge pressure or the discharge of the pump. When fuel oil is burned by feeding it to a burner by means of the electromagnetic pump A, the quantity of combustion of the fuel oil is in direct proportion to the discharge pressure, experimentally.

Accordingly, in case the electromagnetic pump is used, obviously the quantity of combustion can be regulated and adjusted by the adjustment regulation of the electric current flowing in the electromagnetic pump.

Therefore, in case the thermistor $T_H$ is installed in a furnace, the flow current in the thermistor $T_H$ flows in the electric bridge while it is changing according to the resistance value (FIG. 4) which changes correspondingly to the temperature change in the furnace, and the current controls the pulse or the electric current flowing in the electromagnetic circuit of the electromagnetic pump, thereby causing the temperature to rise by the increment of the jet combustion quantity of the fuel oil when the temperature in the furnace is lowered, and conversely if the temperature in the furnace becomes too high, the temperature of the furnace is lowered due to the reduction of the combustion quantity of the fuel oil, whereby the combustion condition continues to maintain a constant temperature value in the furnace when the temperature in the furnace is not changed.

Further in an air-conditioning, refrigeration or freezing apparatus, where the temperature in the chamber thereof is to be maintained at a constant value, thermistor $T_H$ is installed in the chamber and the temperature in the chamber is maintained automatically at the desired temperature by controlling the operation of the freezing apparatus by the control of the pulse or half-wave rectifier current which causes the electromagnetic pump to operate by means of the thermistor $T_H$.

Figure 5:
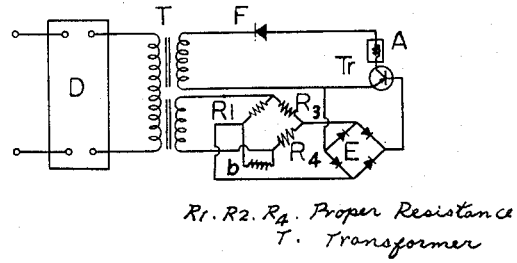
FIGS. 5 to 7 are circuit diagrams disclosing several embodiments according to the present invention.

Referring now again to the drawings and more particularly to FIG. 5, there is shown a circuit for automatic control of the electromagnetic pump with respect to pressure.

The device B, which converts the pressure variation into an electric variation, includes herein, for example, as shown in FIG. 5, a movable iron member $b$ differentiating in a coil accompanying the pressure change. The control device C, comprises a transistor $Tr$. A constant voltage current which has been half-wave rectified, or a pulse having the same effect, is connected to an electromagnetic pump operating circuit, and the pressure in an apparatus is maintained at a constant desired value by regulating the discharge quantity or the discharge pressure of the pump A by the control of the half-wave rectifier current or the pulse which causes the electromagnetic pump A to operate by the variation of the constant voltage current change corresponding to the electric variation, that is, the electrical change which is converted into the pressure variation by utilizing the constant voltage current flowing in the electric bridge changing together with the pressure change.

The elements D, T, F, A and E of FIG. 5 indicate the same elements which have been previously described. The device B which converts a pressure variation into an electrical variation constitutes a bridge circuit comprising fixed resistors $R_1$, $R_3$ and $R_4$, and the movable iron member $b$, which is differentially moved in its coil by pressure variation to vary the resistance value. Other components are similar to those illustrated previously.

Figure 6:
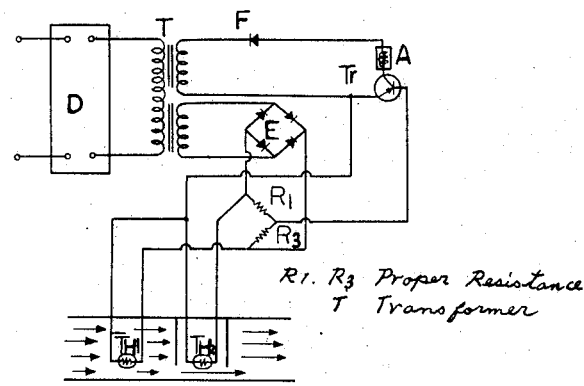

Referring now again to the drawings, and particularly to FIG. 6, a circuit is disclosed for automatic control of the electromagnetic pump with respect to flow.

A thermistor is at a constant temperature when constant current conducts in the thermistor. Accordingly, in case the thermistor is maintained at a constant temperature, and if the thermistor is placed in a flowing fluid, the temperature of the thermistor is lowered due to the absorption of heat by the fluid according to the speed of the fluid, whereby the quantity of flow can be automatically maintained at a specific value by the automatic regulation of the discharge pressure or the quantity of flow of a pump by the adjustment and control of the electric current which operates the electromagnetic pump, utilizing the change in the resistance of the thermistor, caused by a change corresponding to the change of temperature.

As is shown in FIG. 6, device B for converting the changing flow to an electric variation, for instance, comprises a thermal or heater type thermistor $T_{H_1}$ and a temerature compensating thermistor $T_{H_2}$ encased in an apparatus, so as not substantially to be affected by the fluid speed. The thermistors are caused to maintain a balance in an electric bridge when a temperature change occurs in the fluid itself, and an unbalanced current in the electric bridge circuit is sent to the electromagnetic pump operating circuit of the constant voltage current which has been half-wave rectified, or a pulse having the same effect, to operate the pump, whereby the quantity of flow is automatically maintained at a specific value by the automatic regulation of the discharge quantity or the discharge pressure of the electromagnetic pump A.

The elements D, T, F, A and E shown in FIG. 6 indicate the same elements previously described. The device B which converts a flow variation into an electrical variation constitutes a bridge circuit formed by resistance elements, such as, fixed resistors $R_1$ and $R_3$, the heater type thermistor $T_{H_1}$, and the temperature compensating thermistor $T_{H_2}$. The device B is connected to the coil $A_1$ of the electromagnetic pump A by means of transistor $Tr$ which serves as a control device C. Other arrangements are similar to those which have been illustrated above.

Figure 7:
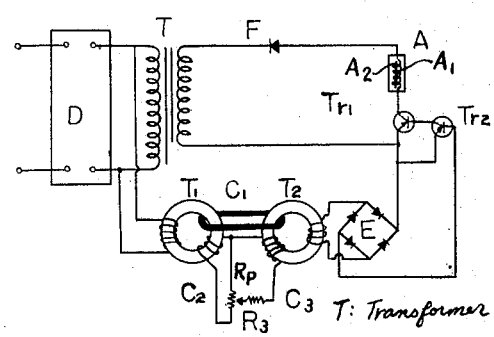

Referring now again to the drawings, and more particularly to FIG. 7, a circuit is disclosed for automatic control of the electromagnetic pump with respect to concentration or density.

As shown in FIG. 7, a liquid short-circuit coil $C_1$ is crossed with an excitation transformer $T_1$ and a detection transformer $T_2$. In the excitation transformer $T_1$, a metallic coil $C_2$ having a variable resistor $R_p$ is wound in the same direction in parallel with the liquid short-circuit coil $C_1$. In the detection transformer $T_2$, a metallic coil $C_3$ having a stationary resistor $R_3$ is wound in an opposite direction in parallel with the liquid short-circuit coil $C_1$. Both coils $C_2$ and $C_3$ are connected as illustrated, when A.C. current is conducted in the primary coil of the excitation transformer $T_1$, and then the A.C. current is conducted in the liquid short-circuit coil $C_1$ by electromagnetic inductance, and simultaneously the A.C. current is conducted in the metallic coil $C_2$ and the current is conducted in the secondary coil of the detection transformer $T_2$ and metallic coil $C_3$. Therefore, when the primary coil is conducted by pouring a liquid of desired concentration in the liquid short-circuit coil $C_1$, and the intrinsic resistor $R_3$ and variable resistor $R_p$ are regulated so that the current flowing in secondary coil of the detection transformer $T_2$ becomes zero, and if the concentration of the liquid short-circuit coil $C_1$ is different from the desired concentration, the current is conducted in the secondary coil of the detection transformer $T_2$.

The elements D, T, F, A and E indicate those elements which have been explained above. The device B converts a density variation into an electrical variation and has already been specifically described. Transistors $Tr_1$ and $Tr_2$ constitute the control device C. These transistors are connected to the coil $A_1$ of the electromagnetic pump A in which coil the plunger $A_2$ of the pump is operatively disposed. Other components of FIG. 7 are similar to those explained previously.

It is obvious that the concentration of the liquid can be adjusted and regulated to the current because the intensity of the current flowing in the secondary coil of the detection transformer $T_2$ is in direct proportion to the difference of the concentration.

Herein, factors such as temperature, pressure, concentration, flow, etc. are defined as operating parameters.

In addition to the description regarding the automatic control methods of the electromagnetic pump according to the present invention, it is further noted that the bridge circuit balance reached by virtue of the combined resistance of the device B which converts a variation in the objective variable factors shown in the foregoing electric circuits into an electrical variation such as resistance, current, etc., is lost due to the electrical variation which causes a signal current to be supplied to the base of the transistor $Tr$ of the control device and, at the same time, the current flowing between the emitter and collector of the transistor $Tr$ connected to the bridge circuit is controlled, whereby the input which excites the coil $A_1$ of the electromagnetic pump A is adjusted to actuate the pump, and thus to control its delivery capacity.

Note:

| Transistor | | |
|---|---|---|
| Emitter | Collector | Electron movement: from emitter to collector |
| | Base | Current direction: from collector to emitter |

While I have disclosed several embodiments of the present invention, it is to be understood that these embodiments are given by example only and not in a limiting sense.

Herein such factors as temperature, pressure concentration, and flow rate are defined as "operating parameters."

What we claim is:

1. An electromagnetic pump circuit for controlling an operating parameter affected by the operation of an electromagnetic pump, comprising an electromagnetic pump having a solenoid and an electromagnetic plunger forming a variable iron core and having an output pressure and an output flow rate variable in direct proportion to the variation of an input current passing through said solenoid, a control transistor directly connected in series to said solenoid of said electromagnetic pump and having a current output providing an input current signal to said solenoid, means for detecting a change in an operating parameter affected by said electromagnetic pump and for converting it into a current variation, and operatively connected to said control transistor for controlling said current output thereof, a resistor bridge circuit means for correcting and transforming said current variation into a suitable value, and a variable circuit means for varying a setting of said operating parameter to a predetermined value, whereby both the output pressure and the output flow rate of said electromagnetic pump are automatically steplessly and proportionately controlled relative to said input current which varies corresponding to said operating parameter so that the latter is maintained at said predetermined value.

2. The circuit, as set forth in claim 1, wherein said operating parameter is temperature.

3. The circuit, as set forth in claim 2, further comprising a constant voltage device,
a full-wave rectifier connected to said constant voltage device and operatively connected to said detecting means,
a half-wave rectifier operatively connected to said constant voltage device and to said control transistor,
said detecting means is a thermistor,
said constant voltage device includes a transformer having two secondary windings,
one of said secondary windings connected between the emitter of said control transistor and said half-wave rectifier,
the other of said secondary windings connected to said full-wave rectifier,
said resistor bridge circuit means comprises first, third and fourth resistors connected in that order, and defining a first junction between said first and third resistors, a second junction between said third and fourth resistors and a first bridge end point at the other end of said first resistor and a second bridge end point at the other end of said fourth resistor,
said full-wave rectifier connected to said first junction and said second bridge end point,
said variable circuit means includes two second variable resistors between which said thermistor is connected,
a switch operatively connected to the free ends of one of said second variable resistors and to said first bridge end point,
said second bridge end point connected between one of said two second variable resistors and said thermistor,
said first bridge end point connected to the emitter of said control transistor,
said second junction connected to the base of said control transistor, and
said solenoid of said electromagnetic pump connected to the collector of said transistor.

4. The circuit, as set forth in claim 1, wherein said operating parameter is pressure.

5. The circuit, as set forth in claim 4, further comprising
a constant voltage device,
a full-wave rectifier connected to said constant voltage device and operatively connected to said detecting means,
a half-wave rectifier operatively connected to said constant voltage device and to said control transistor,
said detecting means is a coil having a movable iron member differentiating in said coil and dependent upon pressure,
said constant voltage device includes a transformer having two secondary windings,
one of said secondary windings connected between the emitter of said control transistor and said half-wave rectifier,
said resistor bridge circuit means comprises a first, second and third resistor connected in that order, and said coil connected across said first and third resistors,
the other of said secondary windings connected at one point between said coil and said third resistor and at another point between said first and second resistors,
said full-wave rectifier connected at one point between said coil and said first resistor, and at a second point between said second and third resistors.
said full-wave rectifier connected directly across the emitter and base of said control transistor, and
the collector of said control transistor connected to said solenoid of said electromagnetic pump.

6. The circuit, as set forth in claim 1, wherein said operating parameter is flow rate.

7. The circuit, as set forth in claim 6, further comprising
a constant voltage device,
a full-wave rectifier connected to said constant voltage device and operatively connected to said detecting means,
a half-wave rectifier operatively connected to said constant voltage device and to said control transistor,
said detecting means comprises two thermistors,
said constant voltage device includes a transformer having two secondary windings,
one of said secondary windings connected between the emitter of said control transistor and said half-wave rectifier,
the other of said secondary windings connected to said full-wave rectifier,
said resistor bridge circuit means connected across said full-wave rectifier and including a first resistor and a second resistor connected to each other at a common end,
said common end connected to the base of said control transistor,
one of said two thermistors connected across said emitter of said control transistor and the other end of said first resistor,
the other of said two thermistors connected across said emitter of said control transistor and the other end of said second resistor,
the collector of said control transistor connected to said solenoid of said electromagnetic pump, and
said two thermistors adapted to be disposed in a fluid flow region operated by said electromagnetic pump for controlling said electromagnetic pump dependent on the flow rate.

8. The circuit, as set forth in claim 1, wherein said operating parameter is concentration.

9. The circuit, as set forth in claim 8, further comprising
a constant voltage device,
a full-wave rectifier connected to said constant voltage device and operatively connected to said detecting means,
a half-wave rectifier operatively connected to said constant voltage device and to said control transistor,
said detecting means comprises an exitation transformer and a detecting transformer,
said constant voltage device includes a first transformer having a primary winding and a secondary winding, said secondary winding is connected between the emitter of said control transistor and said half-wave rectifier, said exitation transformer includes an input coil connected across said primary winding of said first transformer and a first metal coil wound in the same direction relative to said input coil, said variable circuit means comprises a variable resistor connected across said first metal coil, said detection transformer includes an output coil and a second metal coil connected at one end to one end of said first metal coil, a first resistor connected at the other end of said second metal coil to said variable resistor, a liquid short circuit coil connected to said detection transformer and said exitation transformer, said full-wave rectifier connected across said output coil, a second transistor having its emitter and its base connected to said full-wave rectifier, and the emitter of said second transistor connected to the emitter of said control transistor, and the collector of said second transistor connected to the base of said control transistor, and the collector of said control transistor connected to said solenoid of said electromagnetic pump, whereby the latter is controlled dependent on a desire liquid concentration.

References Cited

UNITED STATES PATENTS

| | | | |
|---|---|---|---|
| 2,981,199 | 4/1961 | Weissman et al. | 103—53 |
| 3,195,034 | 7/1965 | Bensema. | |
| 3,233,607 | 2/1966 | Bolie | 103—53 XR |
| 3,252,420 | 5/1966 | Sorensen | 103—25 |
| 3,284,669 | 11/1966 | Boyd | 103—25 XR |
| 3,362,334 | 1/1968 | Ramsay | 103—25 |
| 3,367,124 | 2/1968 | Beck | 103—25 XR |
| 3,408,940 | 11/1968 | McGrogan | 103—25 |

ROBERT M. WALKER, Primary Examiner

U.S. Cl. X.R.

103—25, 53; 317—124, 132; 318—119, 471